M. PECKHAM.
Stove Fire Pot.
No. 14,467.
Patented March. 18, 1856.
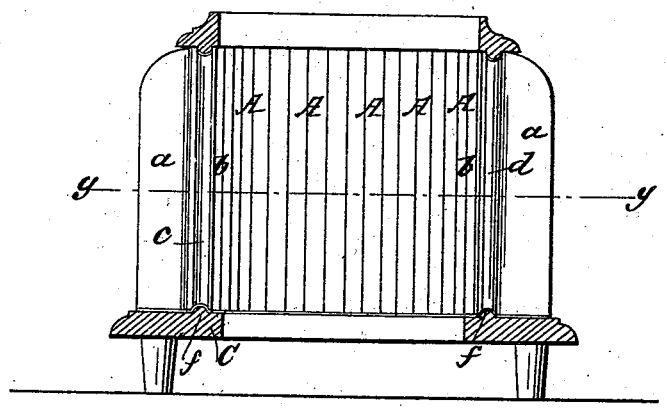
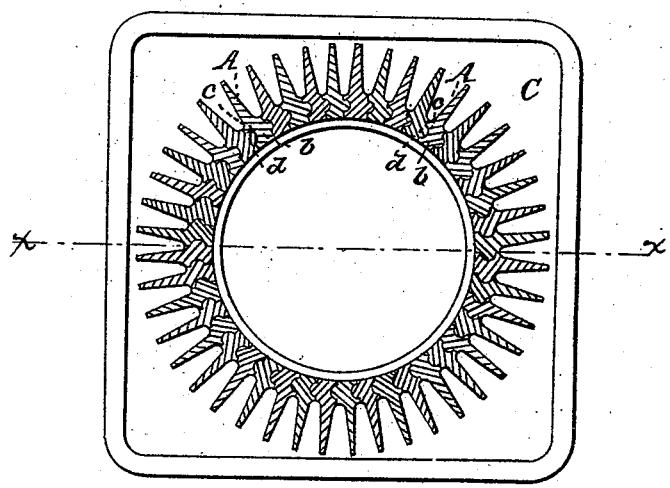

UNITED STATES PATENT OFFICE.

MERRITT PECKHAM, OF UTICA, NEW YORK.

SECTIONAL FIRE-GRATE FOR STOVES AND FURNACES.

Specification of Letters Patent No. 14,467, dated March 18, 1856.

*To all whom it may concern:*

Be it known that I, MERRITT PECKHAM, of Utica in the county of Oneida and State of New York, have invented a new and useful Improvement in the construction of Fire-Pots for Stoves, Furnaces, &c.; and I do hereby declare that the following is a full, clear, and exact description of the same, reference being had to the annexed drawings, making a part of this specification, in which—

Figure 1 is a longitudinal vertical section of my improvement; the plane of section being through the center, as indicated by the line, $(x)$, $(x)$, Fig. 2. Fig. 2, is a horizontal section of the same, $(y)$, $(y)$, Fig. 1, showing the plane of section.

Similar letters of reference indicate corresponding parts in the two figures.

My invention consists in forming the fire pot of vertical sections constructed and fitted together, as will be presently shown and described.

To enable those skilled in the art to fully understand and construct my invention, I will proceed to describe it.

A, represents the sections of which the fire pot is formed. The sections are made of cast iron, and their outer parts, $(a)$, are of taper form; the inner parts, $(b)$, are thicker than the outer parts, $(a)$, and one side of the inner parts has semi-circular recesses, $(c)$, formed in them, and the other sides have semi-cylindrical projections, $(d)$, on them; the projections, $(d)$, corresponding inversely with the recesses, $(c)$, as shown clearly in Fig. 2.

The sections, A, at their inner parts, $(b)$, are fitted together the projections, $(d)$, fitting the recesses, $(c)$, and the joints are radial with the center of the fire pot so that the sections when fitted together will be in a vertical position and tightly jointed and form a circular pot or chamber, the outer parts, $(a)$, being in contact with each other.

The upper edges of the sections, A, have recesses made in them which form when the sections are fitted together an annular groove in which an annular projection, $(e)$, on the lower surface of a ring, B, is fitted. The lower edges of the sections have similar recesses made in them in which an annular projection, $(f)$, on the upper surface of the base, C, fits. The projections, $(e)$, $(f)$, fitting in the upper and lower ends of the sections, and the projection, $(d)$, fitting in the recesses, $(c)$, at the inner parts of the sides of the sections, cause the sections to be secured firmly together.

The advantage of the improvement is that the fire pot cannot be heated red hot, in consequence of a large heated surface being exposed to the atmosphere.

I do not claim forming a fire pot of sections or parts irrespective of the construction and arrangement as herein shown, but what I do claim as new and desire to secure by Letters Patent is—

Forming the fire-pots of stoves, furnaces, etc., of sections, A, when said sections are constructed and secured together, substantially as herein shown and described.

MERRITT PECKHAM.

Witnesses:
WM. P. CARPENTER,
A. R. BENNETT.